US010262298B2

(12) United States Patent
Bernaudin et al.

(10) Patent No.: US 10,262,298 B2
(45) Date of Patent: Apr. 16, 2019

(54) MOBILE DASHBOARD FOR EMPLOYEE PERFORMANCE MANAGEMENT TOOLS

(71) Applicants: Ingrid Bernaudin, Palo Alto, CA (US); Michael Dandan, San Mateo, CA (US)

(72) Inventors: Ingrid Bernaudin, Palo Alto, CA (US); Michael Dandan, San Mateo, CA (US)

(73) Assignee: SuccessFactors, Inc., South San Francisco, CA (US)

( * ) Notice: Subject to any disclaimer, the term of this patent is extended or adjusted under 35 U.S.C. 154(b) by 922 days.

(21) Appl. No.: 14/493,617

(22) Filed: Sep. 23, 2014

(65) Prior Publication Data

US 2015/0332200 A1    Nov. 19, 2015

Related U.S. Application Data

(60) Provisional application No. 61/996,823, filed on May 14, 2014.

(51) Int. Cl.

| | |
|---|---|
| G06F 3/00 | (2006.01) |
| G06Q 10/10 | (2012.01) |
| G06Q 10/06 | (2012.01) |
| G06F 3/0481 | (2013.01) |
| G06F 3/0484 | (2013.01) |
| G06F 3/01 | (2006.01) |

(52) U.S. Cl.
CPC ......... *G06Q 10/105* (2013.01); *G06F 3/0481* (2013.01); *G06F 3/0484* (2013.01); *G06Q 10/06398* (2013.01); *Y04S 10/54* (2013.01)

(58) Field of Classification Search
None
See application file for complete search history.

(56) References Cited

U.S. PATENT DOCUMENTS

| | | | | |
|---|---|---|---|---|
| 2004/0098462 | A1* | 5/2004 | Horvitz | G05B 19/404 709/207 |
| 2006/0155645 | A1* | 7/2006 | Sainsbury-Carter | G06Q 20/40 705/44 |
| 2007/0101284 | A1* | 5/2007 | Shaw | G06Q 10/107 715/772 |
| 2008/0168403 | A1* | 7/2008 | Westerman | G06F 3/04883 715/863 |
| 2009/0299808 | A1* | 12/2009 | Gilmour | G06Q 10/06 705/7.23 |
| 2011/0209052 | A1* | 8/2011 | Parker | G06F 3/0483 715/255 |

(Continued)

*Primary Examiner* — Toan Vu
(74) *Attorney, Agent, or Firm* — Fountainhead Law Group P.C.

(57) ABSTRACT

Techniques are described for a graphical user interface that presents a dashboard on a display of the mobile electronic device. The dashboard includes a footer for presenting commonly used features that are available to a given user. The remaining area in the dashboard is configured to present multiple tiles. Each tile can provide the status of a feature that is available to the user. Depending on the status of a given feature, the tile can change its visual appearance by applying a theme that corresponds to the status. The theme can affect the font, font size, typecast, or general overall appearance of the tile. The dashboard allows a user to monitor the status of features by pushing the status information to the dashboard instead of having the user manually check for the status of each feature.

17 Claims, 17 Drawing Sheets

(56) References Cited

U.S. PATENT DOCUMENTS

| | | | |
|---|---|---|---|
| 2012/0133596 A1* | 5/2012 | Lippolis | G06F 3/04883 345/173 |
| 2012/0209878 A1* | 8/2012 | Park | G06F 3/04817 707/771 |
| 2013/0143587 A1* | 6/2013 | Williams | H04W 4/023 455/456.1 |
| 2013/0179802 A1* | 7/2013 | Martinazzi | H04L 67/22 715/753 |
| 2013/0237287 A1* | 9/2013 | Ferren | H04W 4/16 455/566 |
| 2014/0082534 A1* | 3/2014 | Cleron | G06F 3/04883 715/764 |
| 2014/0173459 A1* | 6/2014 | Gaiser | H04L 67/22 715/753 |
| 2014/0280383 A1* | 9/2014 | Douglas | G06F 17/30507 707/812 |
| 2015/0039745 A1* | 2/2015 | Degioanni | H04L 43/045 709/224 |
| 2015/0180933 A1* | 6/2015 | Spracklen | G06F 17/246 715/740 |
| 2015/0277849 A1* | 10/2015 | Beaumier | G06F 3/041 715/716 |
| 2015/0358391 A1* | 12/2015 | Moon | H04L 67/10 709/224 |
| 2016/0012465 A1* | 1/2016 | Sharp | G06Q 20/18 705/14.17 |
| 2016/0216848 A1* | 7/2016 | Ioffe | G06F 17/30056 |

\* cited by examiner

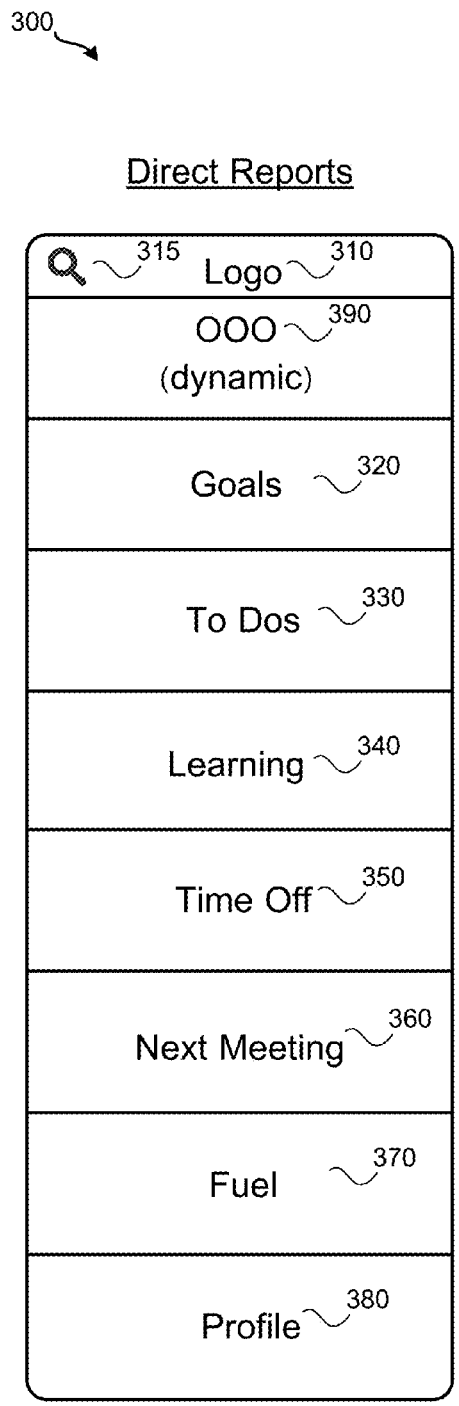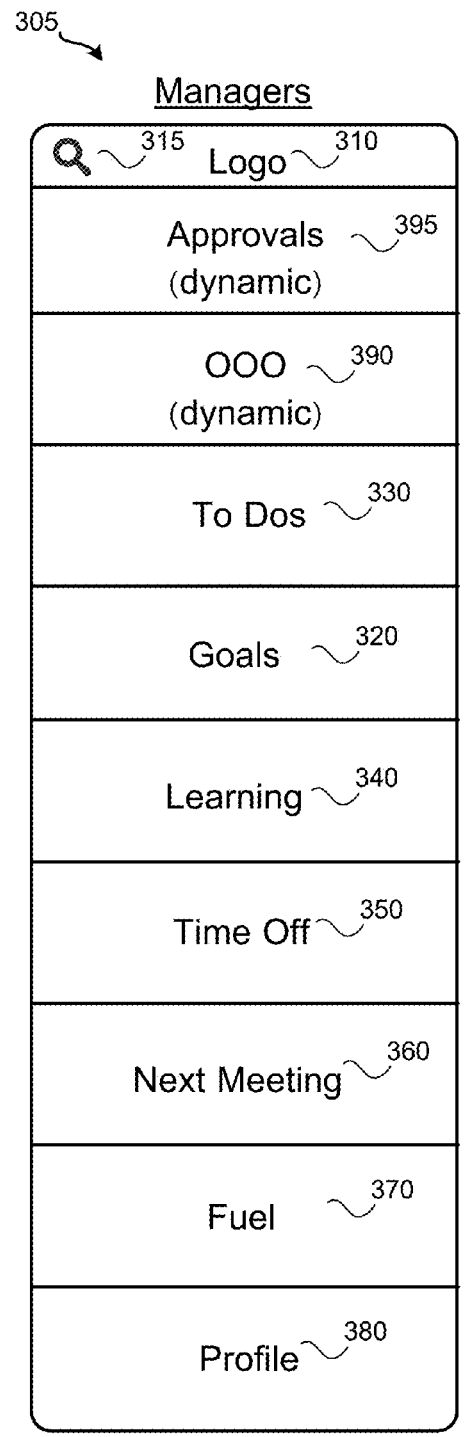
FIG. 3A  FIG. 3B

MOBILE DASHBOARD FOR EMPLOYEE PERFORMANCE MANAGEMENT TOOLS

CROSS-REFERENCE TO RELATED APPLICATION

The instant nonprovisional patent application claims priority to U.S. Provisional Patent Application No. 61/996,823, filed May 14, 2014 and incorporated by reference in its entirety herein for all purposes.

BACKGROUND

As businesses grow, so does the size of its workforce. Over time, the size of the workforce may become large enough that employee performance management tools are needed to organize the efforts of all the employees within the business organization. Employee performance management tools provide features that help employees communicate with and manage one another. While the features provided serve to improve employee productivity, the reality is that monitoring the features can be very time consuming, particularly for managers of the business organization who need utilize the various features on a daily basis. For example, a manager can start a first application to monitor one feature, close the first application, and then start a second application to monitor a second feature. A manager can traverse through many different applications throughout the day to check for updates from the various direct reports. This can be a very cumbersome and time consuming processes.

Furthermore, employees in large business organizations are often traveling from one office building to the next. As a result, the employee performance management tools are often accessed on a mobile electronic device. Given that the display on a mobile electronic device is typically small in size, a limited amount of information can be presented to the employee on a given screen. As a result, the applications provided to access the tools often require the employee to perform many steps before the desired information can be accessed. This further exasperates a managers frustrations when monitoring direct reports.

SUMMARY

In one embodiment, a computer-implemented method presenting, by a portable electronic device, a dashboard containing an ordered list of tiles that are configured to report on features of a performance management tool remote to the portable electronic device, wherein a first tile is configured to report on a management feature provided by the performance management tool. The method can continue by detecting, by the portable electronic device, an alert for the management feature. The method can the first tile in response to the alert.

In another embodiment, a non-transitory computer readable storage medium stores one or more programs comprising instructions for presenting a dashboard containing an ordered list of tiles that are configured to report on features of a performance management tool remote to the portable electronic device, wherein a first tile is configured to report on a management feature provided by the performance management tool, detecting an alert for the management feature, and updating the first tile in response to the alert.

In another embodiment, a computer implemented system comprises one or more computer processors and a non-transitory computer-readable storage medium. The non-transitory computer-readable storage medium comprises instructions, that when executed, present a dashboard containing an ordered list of tiles that are configured to report on features of a performance management tool remote to the portable electronic device, wherein a first tile is configured to report on a management feature provided by the performance management tool, detect an alert for the management feature, and updating the first tile in response to the alert.

The following detailed description and accompanying drawings provide a better understanding of the nature and advantages of the present disclosure.

BRIEF DESCRIPTION OF THE DRAWINGS

FIG. 3A illustrates an exemplary collection of tiles for a direct report according to one embodiment;

FIG. 3B illustrates an exemplary collection of tiles for a manager according to one embodiment;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Techniques are described for a graphical user interface that presents a dashboard on a display of the mobile electronic device. The dashboard includes a footer for presenting commonly used features that are available to a given user. The features in the footer can be predefined or manually selected by the user. The remaining area in the dashboard is configured to present multiple tiles. Each tile can provide the status of a feature that is available to the user. Depending on the status of a given feature, the tile can change its visual appearance by applying a theme that corresponds to the status. For example if a feature has an urgent status that requires immediate review, the dashboard application can apply a theme. The theme can affect the font, font size, typecast, or general overall appearance of the tile. For example, the icon or image that is presented within a tile can change according to the theme. As a result, the dashboard allows a user to monitor the status of features by pushing the status information to the dashboard instead of having the user manually check for the status of each feature.

Figure 1:
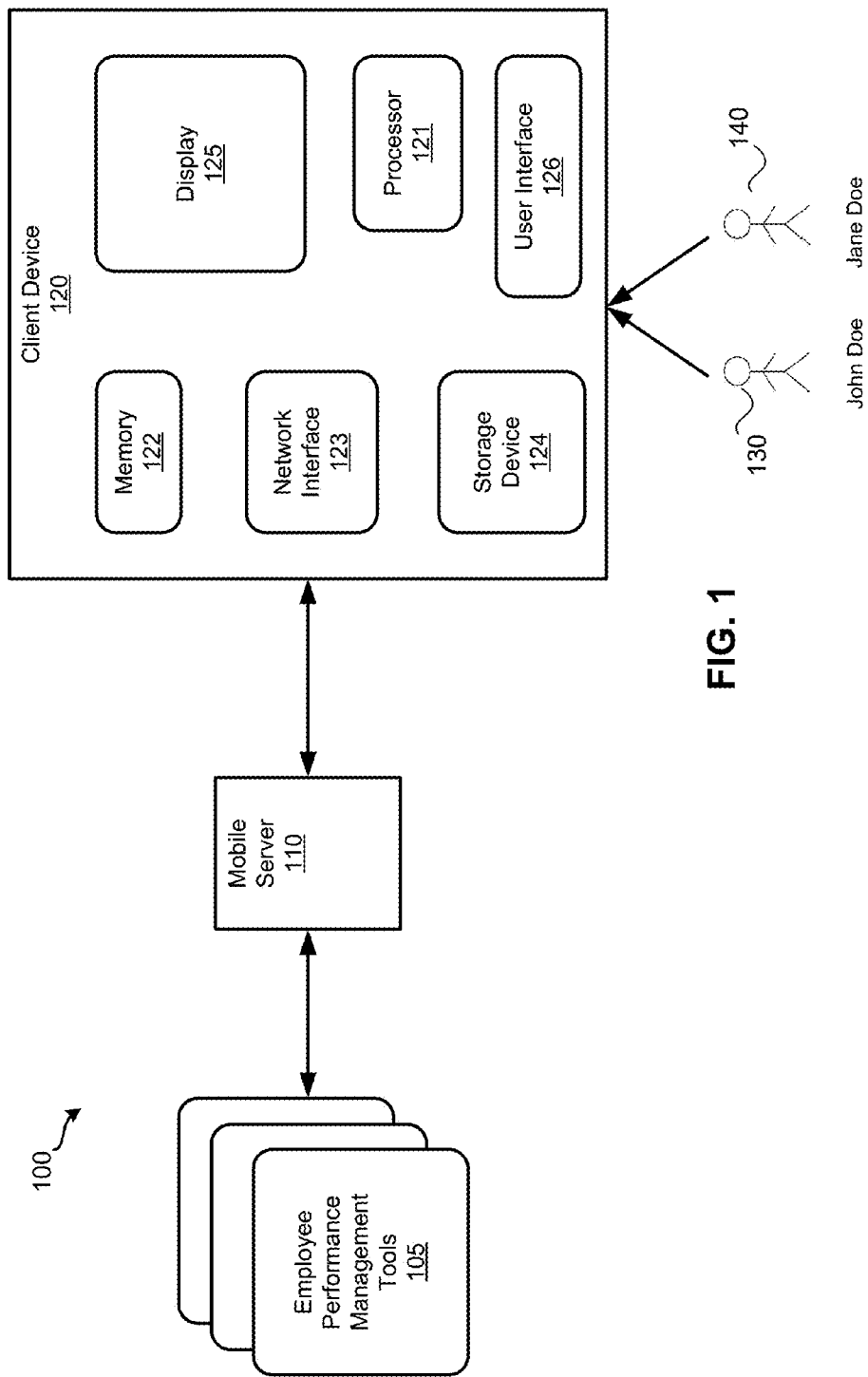
FIG. 1 illustrates a system for presenting a dashboard on a client device.

FIG. 1 illustrates a system for presenting a dashboard on a client device. System 100 includes employee performance management tools 105, mobile server 110, and client device 120. Employee performance management tools 105 are performance management applications for employees within an organization while mobile server 110 directs traffic between employee performance management tools 105 and client device 120. Each application can provide one or more features which can be monitored on client device 120 through a dashboard application. Client device 120 can be a portable electronic device that is operated by one or more employees of the organization. In one example, each employee may have his or her own client device. In another example, multiple employees may share a single client device. Client device 120 includes processor 121, memory 122, network interface 123, storage device 123, display 125, and user interface 126. Processor 121 can execute a dashboard application stored in memory 122 or storage device 124. The dashboard application can generate a graphical user interface of a dashboard on display 125. The dashboard can provide updates on the status of various features of employee performance management tools 105 that are available to the user. This allows the user to easily monitor the status of features by interacting with the dashboard. In some embodiments, update information can be pushed from employee performance management tools 105 to client device 120. The dashboard application can process the update information and update the tiles in the dashboard accordingly. Through the tiles in the dashboard, the user can monitor multiple features simultaneously and if necessary, make adjustments to a feature through graphical icons in the dashboard.

Here, system 100 includes user 130 named "John Doe" and user 140 named "Jane Doe." User 130 can log into client device 120 by providing a secure identifier, such as a username/password or a private token. Once logged into client device 120, processor 121 can execute a dashboard application. The dashboard application can transmit requests through network interface 123 to employee performance management tools 125. The requests can be to retrieve feature information that is associated with user 130. Once the feature information is received, the dashboard application can present a dashboard on display 125. User 130 can interact with the dashboard on display 125 through user interface 126. The interactions can be for presenting additional information that is relevant to a tile in the dashboard or for providing instructions to a feature represented by a tile in the dashboard.

Figure 2:
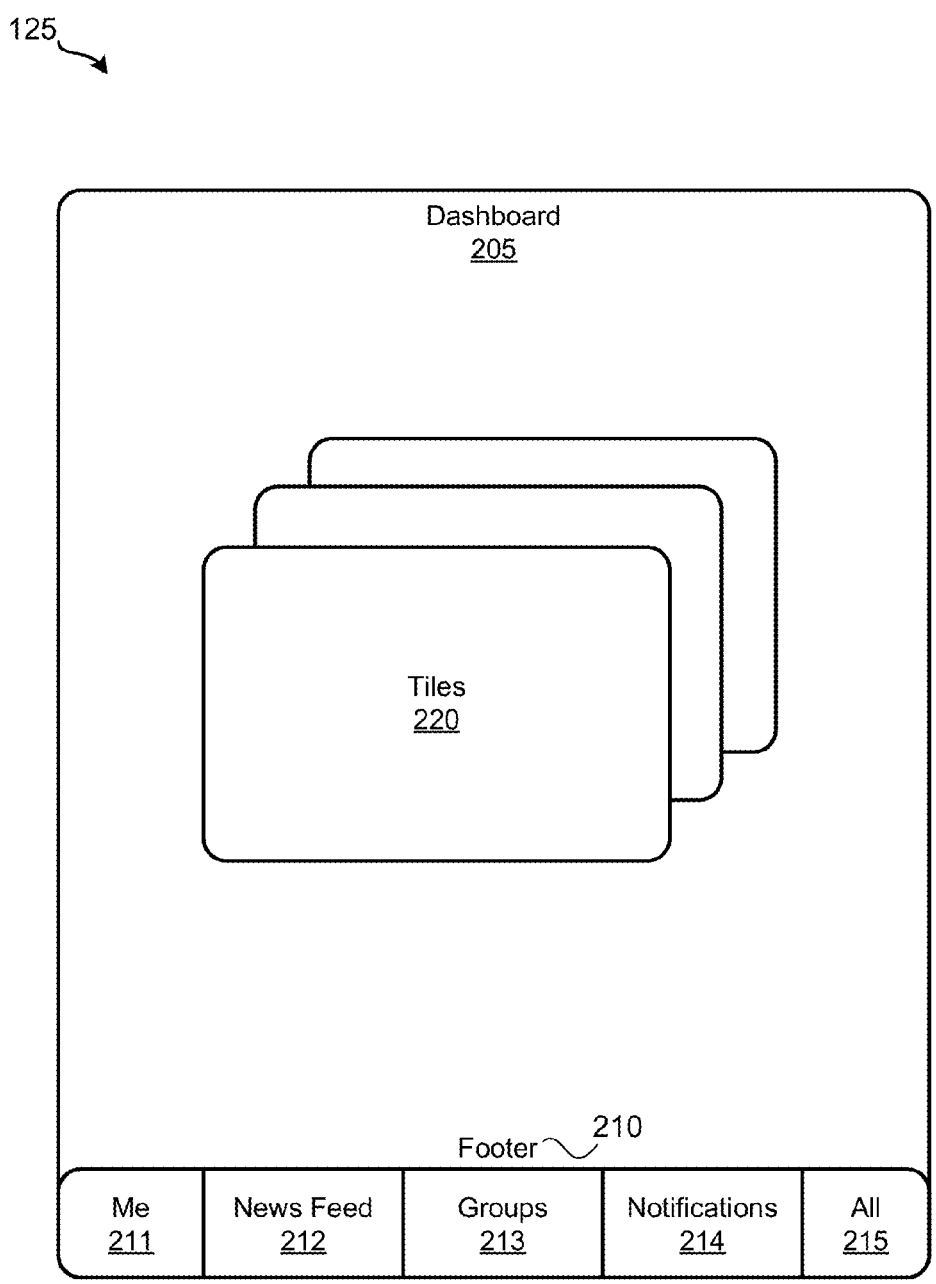
FIG. 2 illustrates a display of a client device according to one embodiment.

FIG. 2 illustrates a display of a client device according to one embodiment. Display 125 includes dashboard 205 which occupies some or all of display 125. In some examples, dashboard 205 can be configured to occupy a predefined area of display 125. Dashboard 205 includes footer 210. Footer 210 can contain one or more common features that are available to the user of the client device. In one embodiment, footer 210 can present available features that are ordered based on a guide. The guide can specify an ordering that available tiles should appear in footer 210 if the feature that corresponds to the tile is available for the user. In one embodiment, positioned along a border of dashboard 205 and occupy a predefined area of dashboard 205. Here, footer 210 is positioned along the south edge of dashboard 210 and the footer contains an icon for each of "Me" feature which presents tiles that are relevant to the user of the client device (icon 211), a "News Feed" feature which presents tiles that present news of interest to the user (icon 212), "Groups" feature which presents information on groups which the user belongs to (icon 213), "Notifications" feature which presents notifications for features that require the user's attention (icon 214), and "All" feature which presents all the features that are available to the user (icon 215). In other embodiments, the ordering or the listing of features in footer 210 can vary. For example, other features in footer 210 can include team cockpit, analytics, learning plan, time off, goals, tasks, touchbase, meetings, user profile, and settings. In some embodiments, the dashboard application can hide footer 210 from dashboard 205 to maximize the space available to perform a task at hand. For example, footer 210 can be hidden when details related to a feature are presented on dashboard 205 so that dashboard 205 in its entirety can be devoted to presenting details on the feature. For instance, footer 210 can be hidden when the user is in the middle of posting a comment, requesting a two week vacation, or creating a new discussion topic. In some examples, the dashboard application can hide footer 210 by fading footer 210 out of dashboard 205 or by moving footer 210 towards the nearest boundary of dashboard 205 until footer 210 is no longer displayed within dashboard 205.

Dashboard 205 further includes tiles 220. Tiles 220 is a collection of tiles where each tile represents a feature that is available to the user. In one example, each user can have feature permissions which define the features that are available to the user. The tiles that correspond with the available features can be presented in tile 220. Tiles 220 can be presented vertically where one tile abuts another tile on a horizontal border of the tiles. In some examples, the number of tiles to be presented for a user can exceed the number of tiles that can be displayed simultaneously on dashboard 205. In these situations, the dashboard application can be configured to receive user input to scroll up and down through the collection of tiles so that a portion of the tiles are visible on dashboard 205 while the remaining tiles are not. When input is received to scroll up and down through the collection of tiles, the portion of tiles that are visible on dashboard 205 can change. To view the collection of tiles on dashboard 205, the user can scroll up and down through the collection until the desired tile is visible on dashboard 205. In some examples, scrolling to the end of the collection can continue at the beginning of the collection, and vice versa.

In some examples, managers and direct reports may have access to a different set of features. As a result, managers and direct reports may have access to a different set of tiles. FIG. 3A illustrates an exemplary collection of tiles for a direct report according to one embodiment. As shown here, tiles 220 have been organized into ordered list 300. In one embodiment, the dashboard application can order the tiles according to a predefined order, which can be user defined or defined by a system administrator. Having the tiles in a predefined order can produce an ordered list that the user can become accustomed to. Over time, the user can begin to manipulate through ordered list 300 with ease. In another embodiment, the dashboard application can order the tiles based on urgency. When urgent updates for a feature are received, the tile corresponding to the feature can be ordered closer to the top of ordered list 300 so that urgent matters appear towards the front of ordered list 300. In yet another embodiment, the dashboard application can add a first tile to ordered list 300 when an update for a feature corresponding to the first tile is received and remove a second tile when a feature corresponding to the second tile has been reviewed. This can minimize the number of tiles in ordered list 300, thus allowing the user to focus on the updates which are available.

Ordered list 300 can begin with logo tile 310. Logo tile 310 can be configured to display a logo, emblem, mark, or icon that represents the business organization. Logo tile 310 can also include search icon 315. Search icon 315 can be an actionable icon where the dashboard application can be configured to receive search parameters when search icon 315 is selected. This allows a user to search the dashboard for a feature or entry. Ordered list 300 further includes an out of office (OOO) tile 390. OOO tile 390 can be a dynamic tile which appears in ordered list 300 when the user is currently or is going to be out of the office (e.g., on vacation or on personal leave). Since OOO tile is dynamic, the tile may not appear in ordered list 300 when the user is not out of the office. Since OOO tile 390 only appears in ordered list 300 when there is an update to report, OOO tile 390 is a dynamic tile. Dynamic tiles can remind hidden when there is nothing to report. In other embodiments, other tiles within ordered list 300 can also be dynamic in nature.

Ordered list 300 further includes goals tile 320, to dos tile 330, and learning tile 340. Goals tile 320 is configured to provide the status on the user's goals. To dos tile 330 is configured to provide the status on the user's to dos list. Similarly, learning tile 340 is configured to provide the status on the user's learning center. For example, the user's progress on a class that the user is taking can be presented on learning tile 340. Depending on whether the user is behind on his goals, to dos, or classes, their respective tile can be presented with a level of urgency. The urgency of a feature can be adjusted by changing the font, typography, the size of the font, and/or the color of the font.

Ordered list 300 further includes time off tile 350 and next meeting tile 360, fuel tile 370, and profile tile 380. Time off tile 350 is configured to present an overview of the time that the user has available for time off. In one embodiment, a timeline can be presented showing the amount of time that the user has taken off and also the amount of time that the user can take off, including sick days, vacation days, and military days. Next meeting tile 360 is configured to present an update on meetings that are on the employee's calendar application. In one embodiment, the desktop application may present next meeting tile 360 in differently depending on the amount of time that remains before the meeting. Fuel tile 370 can be configured to present information related to fuel reimbursement for the user. Profile tile 380 can be configured to a summary of the user's profile.

FIG. 3B illustrates an exemplary collection of tiles for a manager according to one embodiment. While ordered list 300 of FIG. 3A is for a direct report, ordered list 305 of FIG. 3B is for a manager. Both ordered list 300 and ordered list 305 include many of the same tiles since many of the same features are available to both employees. However, ordered list 305 for a manager further includes approvals tile 395. Approvals tile 295 can be similar to OOO tile 390 in that approvals tile 395 is dynamic in nature. When there are no approvals to approve, approvals tile 295 can disappear from ordered list 305. Where there are approvals to approve, approvals tile 295 can appear in ordered list 305. In some examples, dynamic tiles can appear in the front of the list when there is something to report.

The following is a discussion on the properties of some exemplary tiles that may be included in ordered list 300 and ordered list 305. As described above, the visual appearance and the information presented within each tile can change depending on the status of the feature that corresponds with the tile. In some embodiments, a tile can take on a first theme when the status of the feature has high-urgency and take on a second theme when the status of the feature has low-urgency. By visualizing the urgency of a feature on the dashboard, the user can address urgent issues before addressing non-urgent ones.

Out of Office Tile

Figure 4A:
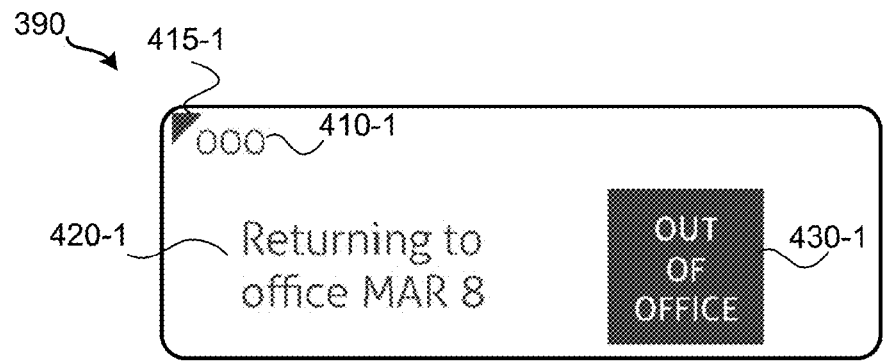
FIG. 4A illustrates an exemplary tile for representing an out of office feature according to one embodiment.

FIG. 4A illustrates an exemplary tile for representing an out of office feature according to one embodiment. As shown here, OOO tile 390 follows a theme that includes headline 410-1, alert flag 415-1, message 420-1, and icon 430-1. Together, these elements of OOO tile 390 describe the current state of the out of office feature. Depending on the state of the feature, the dashboard application can apply a different theme to OOO tile 390. As described earlier, OOO tile can be a dynamic tile which remains hidden unless the user is out of the office of is about to be out of the office.

Here, the theme includes headline 410-1 which is configured to distinguish OOO tile 390 from other tiles in the collection of tiles. Headline 410-1 includes the text "OOO," which is unique to OOO tile 390 and therefore headline 410-1 can distinguish an OOO tile from other tiles. The theme also includes alert flag 415-1. Dashboard application can toggle alert flag 415-1 on when the user's attention is required. In some examples, the dashboard application can give priority to tiles having the alert flag toggled on and place them at the top of the ordered list of tiles. The theme further includes message 420-1 and icon 430-1. Together, message 420-1 and icon 430-1 can provide details on the status of the feature that corresponds with OOO tile 390. Here, message 420-1 notifies the user that he is currently out of the office and will be returning to the office on March $8^{th}$. Icon 430-1 serves as a further reminder that the user is currently out of the office. Given that the user is on personal time, the user should not be doing work. As a result, the dashboard application can give toggle alert flag 415-1 on OOO tile 390 and place OOO tile 390 in front of the ordered list. Seeing the OOO file 390 in the first tile in the ordered list can serve as a reminder to the user that the user is currently should not be doing office work. In one embodiment, other tiles in the ordered list can remain hidden when the feature notifies the dashboard application that the user is currently out of the office. In another embodiment, all other tiles in the ordered list except tiles having a high-urgency status can remain hidden in the ordered list while the OOO tile is active.

Figure 4B:
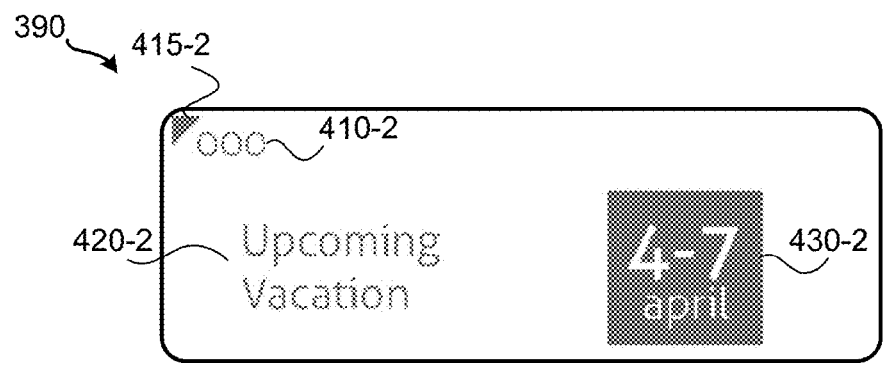
FIG. 4B illustrates another exemplary tile representing an out of office feature according to another embodiment.

FIG. 4B illustrates another exemplary tile representing an out of office feature according to another embodiment. Here, the dashboard application has generated OOO tile 390 by using a different theme than OOO tile 390 shown in FIG. 4A. The dashboard application may have used a different theme since the out of office feature is in a different state. In FIG. 4A, the OOO feature notified the dashboard application that the user is currently out of the office while in FIG. 4B, the OOO feature notified the dashboard application that the user is about to be out of the office. Since a different theme is being applied before the user goes out of the office than when user is actually out of the office, headline 410-2, alert flag 415-2, message 420-2 or icon 430-2 can have a different visual appearance than headline 410-1, flag 4151, message 420-1, or icon 4301, respectively. The elements in the different themes can vary in font, font size, typography, and other visual indicators. For example, headline 410-1 can be in the color red while headline 410-2 can be in the color blue. Moreover, each element of the theme can take on a different role in the tile. For example, the theme used to generate OOO tile 390 of FIG. 4A uses message 410-1 to notify the user the period of time that the use will be on vacation while the theme used to generate OOO tile 395 of FIG. 4B uses icon 430-2 to notify the user the period of time that the user will be on vacation.

Approval Tile

Figure 5:
FIG. 5 illustrates an exemplary tile for representing an approval feature according to one embodiment.

FIG. 5 illustrates an exemplary tile for representing an approval feature according to one embodiment. Approval tile 395 can be generated by the dashboard application according to a theme. The theme for approval tile 395 can be substantially similar to the theme for OOO tile 390 as both themes include headline 510, alert flag 515, message 520, and icon 530. However, the theme for approval tile 395 also includes action button 540. Action button 540, when selected, can trigger an event in the dashboard application. When the event is triggered, the dashboard application can transition the dashboard from the ordered list of tiles to a large tile configured to present a list of approval items that require the user's approval. Each approval item can include an action button that when selected by the user, allows the user to approve the approval item. When the dashboard application detects that an approval item has been approved, the dashboard application can transmit this information back to the remote tool that is managing this feature. Here, the dashboard application can modify message 520 to display the number of approvals that are waiting for approval. As the number of pending approvals change due to information being received from the approval feature, the dashboard application can modify message 520 to display the correct number of pending approvals.

Figure 6:
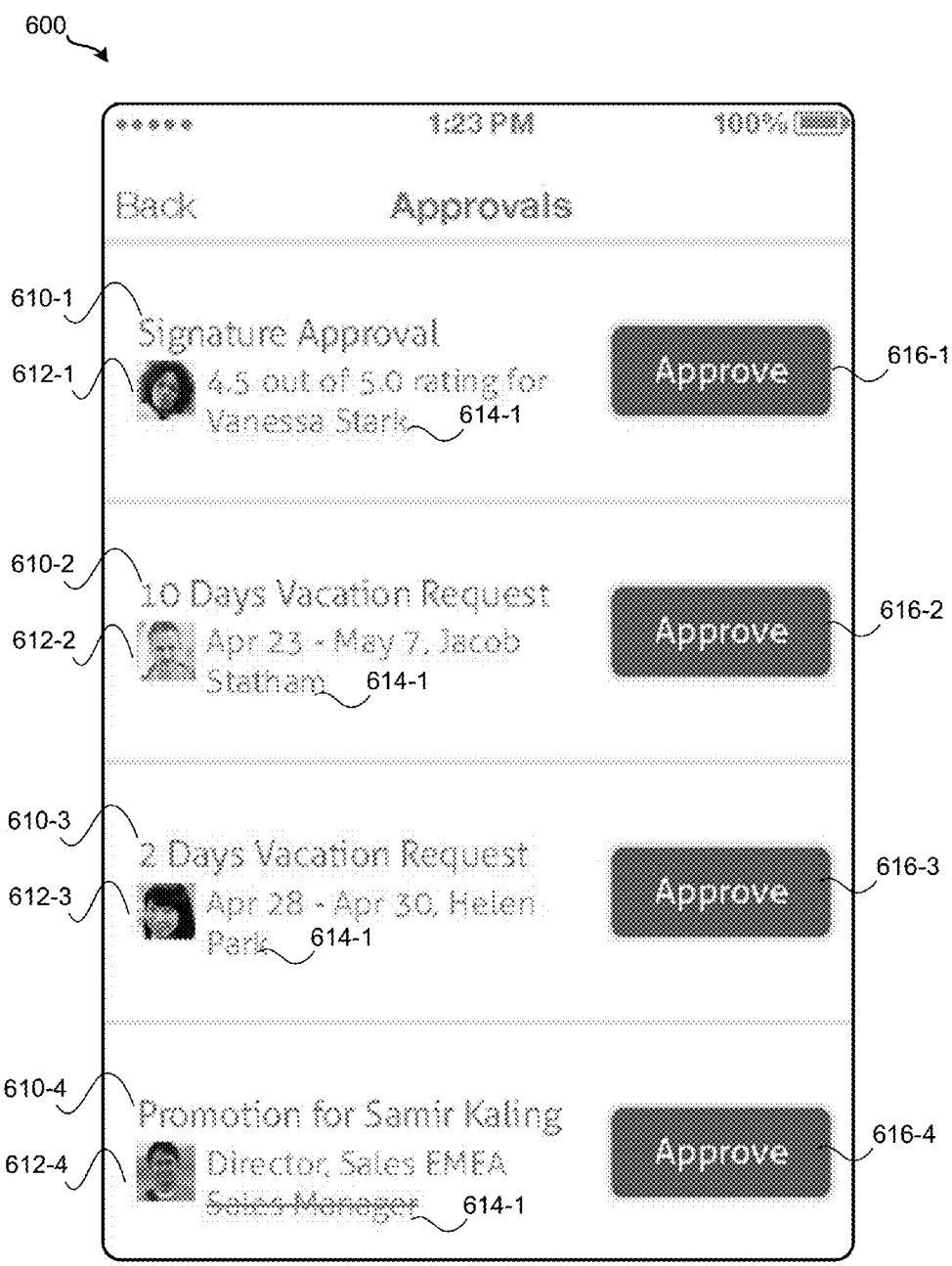
FIG. 6 illustrates an exemplary graphical user interface (GUI) for approving approvals according to one embodiment.

FIG. 6 illustrates an exemplary graphical user interface (GUI) for approving approvals according to one embodiment. Approval GUI 600 can be configured to present a plurality of approval items on the dashboard. Each approval item can include headline 610, avatar 612, description 614, and action button 616. Headline 610 can contain a phrase that introduces the purpose of the approval. For example, headline 610-1 contains the text "Signature Approval" so that the user knows the purpose of this approval. Similarly, headline 610-2 contains the text "10 Days Vacation Request" so that the user knows that the approval item is related to a vacation request. Avatar 612 can be configured to present an image of the person that is seeking approval while description 614 can include a description of the approval. Together, avatar 612 and description 614 can provide context to the approval by informing the user who is seeking approval and details on the approval. Action button 616 is an actionable icon. The dashboard application can transmit an approval instruction for the approval item to an approval feature when action button 616 is selected.

Typically employees are cognizant of the approval items they receive so little time is spent reviewing each approval item. However if desired, additional information on an approval item can also be presented to the user. In some embodiments, headline 610, avatar 612, or description 614 can be actionable elements. When selected, the dashboard application can transition approval GUI 600 to a detailed description page that includes details on the approval item. For example, the last approval item in approval GUI 600 is for promoting an employee to a director of Sales EMEA. When the dashboard application detects that headline 610 can been selected in approval GUI 600, the dashboard application can transition approval GUI 600 to a detailed view of an approval item. The detailed view can occupy a larger portion of the dashboard than the approval item. In some examples, the detailed view can occupy the dashboard in its entirety, which includes hiding the footer. The detailed view can include details such as the annualized salary for the employee due to the promotion, the change in job title due to the promotion, and the total earnings opportunity due to the promotion. The detailed view can also include two action buttons to reject or approve the approval item. In other words, the detailed view can include the option to reject or approve the approval item while approval GUI 600 only includes the option to approve the approval item. This is to reduce clutter in approval GUI 600 since most users find themselves approving the approval items with little review.

Goals Tile

Figure 7A:
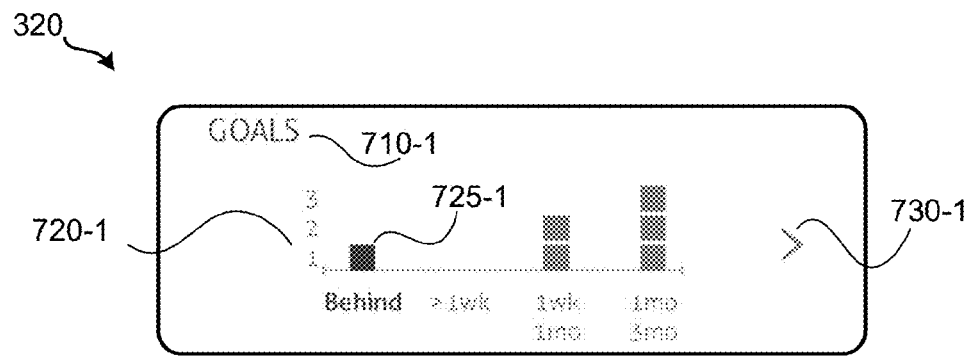
FIG. 7A illustrates an exemplary tile for representing a goals feature according to one embodiment.

FIG. 7A illustrates an exemplary tile for representing a goals feature according to one embodiment. Goals tile 320 can be generated by the dashboard application according to a theme. Depending on the theme, the dashboard application can present information received from the goals feature to generate goals tile 320 using a different font, font size, typeface, or other changes to the visual appearance of goals tile 320. In one embodiment, the dashboard application can select a theme for goals tile 320 based on the status of a goals feature. If the goals feature has a high-urgency, then the dashboard application can generate goals tile 320 using a high priority theme. If the goals feature has low-urgency, then the dashboard application can generate goals tile 320 using a low priority theme. In one example, the dashboard application can determine the status from the information received from the goals feature. In another example, the status of the goals feature can be directly received from the goals feature. Goals tile 320 includes headline 710, chart 720, and action button 730.

Here, the dashboard application generates goals tile 320 using a theme that corresponds to a status of high-urgency. The high-urgency status can be received from the goals feature since one user goal is already behind schedule.

Alternatively, the dashboard application can determine that a theme corresponding to high-urgency status should be applied to goals tile 395 since the information received from the goals feature includes a goal which is already behind schedule. Based on the high-urgency theme, the dashboard application can generate headline 710-1 by using a font and typeface that corresponds with the high-urgency theme. Dashboard application can also generate chart 720-1 with the urgent elements within the chart (e.g., element 725-1 that represents the past due goal) highlighted or otherwise visually modified for identification purposes. Lastly, the dashboard application can generate action button 730-1 which when selected, can cause the dashboard application to present details on the user's goals on the dashboard.

Figure 7B:
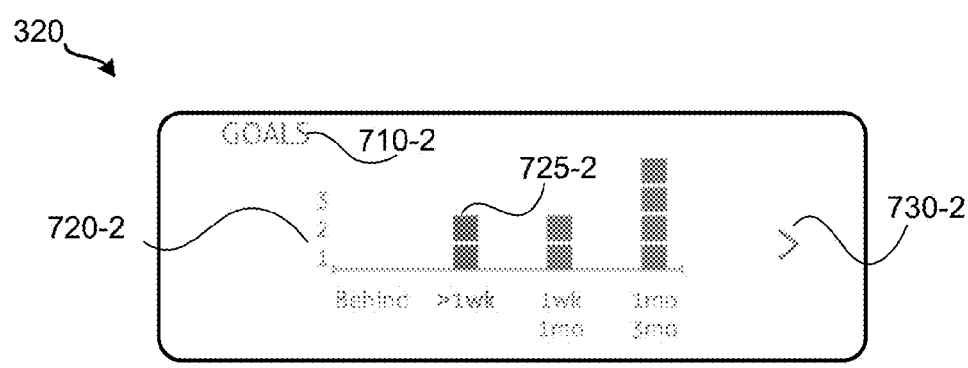
FIG. 7B illustrates another exemplary tile for representing a goals feature according to one embodiment.

FIG. 7B illustrates another exemplary tile for representing a goals feature according to one embodiment. As shown here, the dashboard application can generate goals tile 320 using a theme that corresponds with a feature status of normal-urgency. Normal urgency can be applied when there are goals due within a week. In contrast, high-urgency is applied when there are goals that are past due. The normal-urgency theme can specify the font, font size, typeface, or other visual attributes of goals tile 320. Here, the dashboard application can generate the normal-urgency status using a blue color for the font of headline 710-2 and element 725-2, which is part of chart 720-2 and can generate the high-urgency status using a red color for the font of headline 710-1 and element 725-1.

Figure 7C:
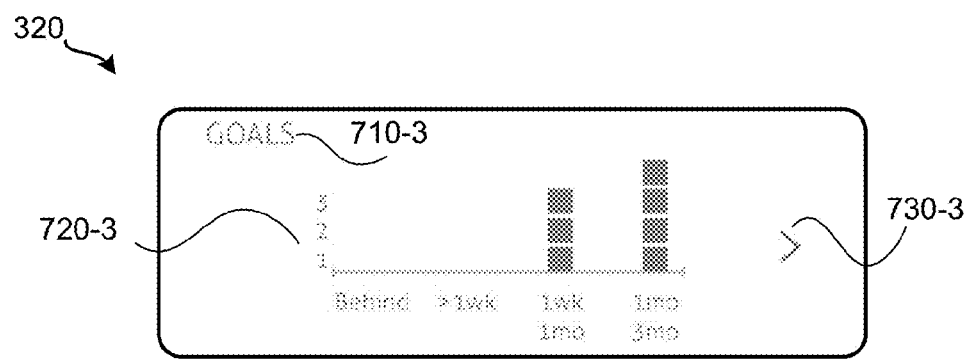
FIG. 7C illustrates another exemplary tile for representing a goals feature according to one embodiment.

FIG. 7C illustrates another exemplary tile for representing a goals feature according to one embodiment. As shown here, the dashboard application has applied a low-urgency theme to the information received from the goals feature. The dashboard application can apply the low-urgency theme when the information received from the goals feature does not contain any urgent issues that need the employee's attention. Here, goals tile 320 includes headline 710-3, chart 720-3, and action button 730-3. In some embodiments, the font and font size used for elements such as headline 710 and action button 730 can be the same irrespective of the theme. The different themes may however change the color of the headline and action button, thus making it possible for the user to easily infer the urgency of the tile.

Figure 8:
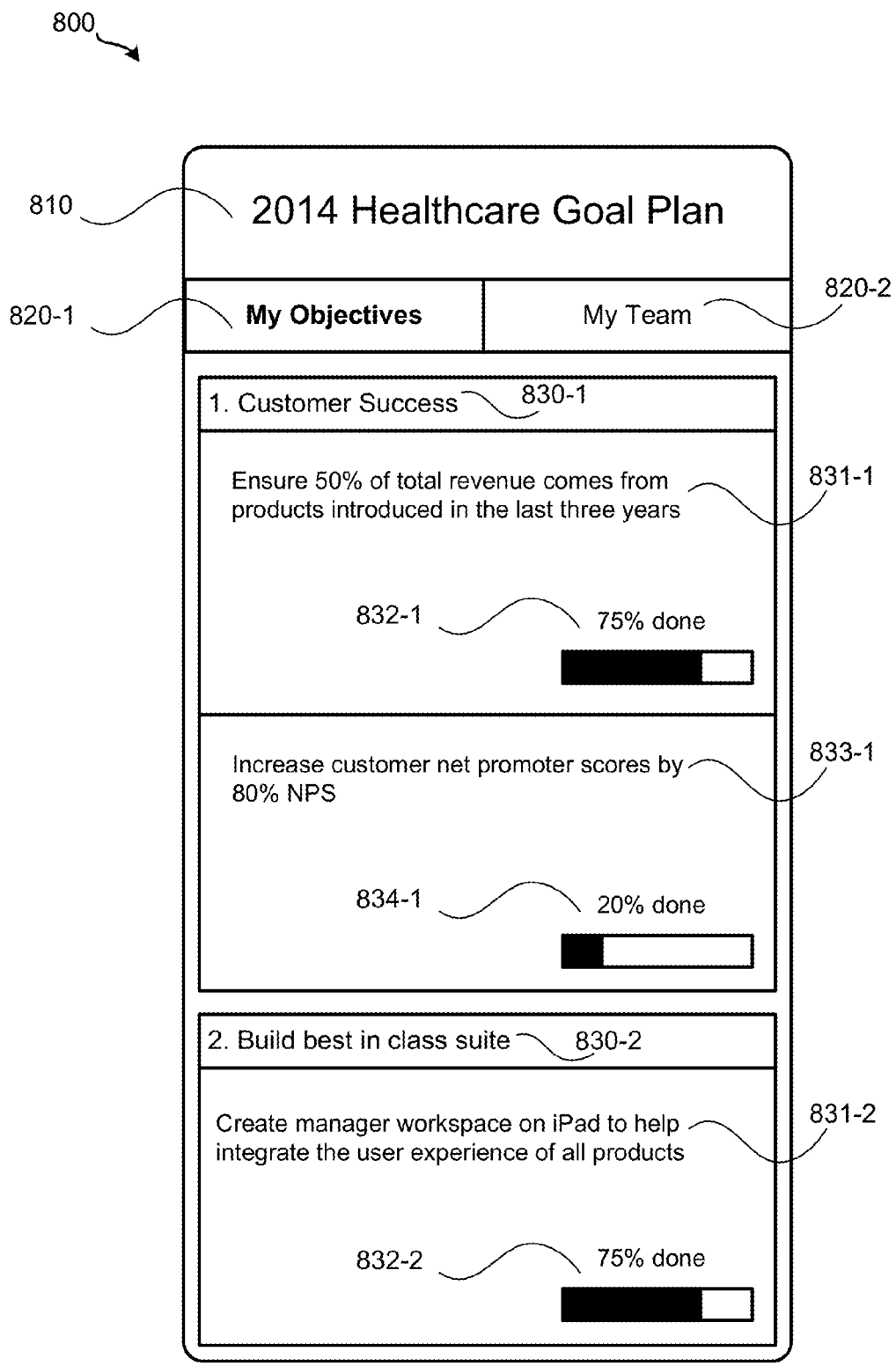
FIG. 8 illustrates an exemplary graphical user interface (GUI) for evaluating goals according to one embodiment.

When action button 730 in goals tile 320 is selected, the dashboard application can present details of the user goals on the dashboard. FIG. 8 illustrates an exemplary graphical user interface (GUI) for evaluating goals according to one embodiment. Goals GUI 800 can be presented by the dashboard application when action button 730-2 of FIG. 7B is selected. FIG. 7B includes a goals chart where two goals are due within the week. When action button 730-2 is selected, the dashboard application transitions from presenting multiple tiles to presenting a single tile that includes details for the two goals. Goals GUI 800 includes headline 810, my objectives icon 820-1, my team icon 820-2, goal 830-1 and goal 830-2. Headline 810 can present a title for the user's goals. My objectives icon 820-1 can be a selectable icon that when selected, presents the user's goals in the dashboard. Alternatively, selecting my team icon 820-2 can cause the dashboard application to present the goals of the team in the dashboard. Here, my objectives icon 820-1 has been selected by the user. Dashboard application can bold my objectives icon 820-1 when it is selected as a visual indicator of the selected option. The goals of the user include a first goal having headline 830-1 titled "Customer Success" and a second goal having headline 8302 titled "Build best in class suite". The first goal can be divided into sub-goals with description 831-1 and 833-1. Each sub-goal can be accompanied by percentage completion bar 832-1 and 834-1 to notify the user how much of the goal has been completed. Similarly, the second goal has a sub-goal with description 831-1 and percentage completion bar 832-2.

To Dos Tile

Many features can generate to do items for the user. In one embodiment, the dashboard application can aggregate the to do items from multiple features and summarize the to do items in to dos tile 330. In one embodiment, a status can be assigned to the to do list based on the aggregated information. For example, if the to do list contains to do items that are overdue, a high-urgency status can be assigned to the list. Alternatively if the to do list contains to do items that are due within the week, a normal-urgency status can be assigned to the list. Lastly if there are no to do items due within the week, a low-urgency status can be assigned to the list. Depending on the status of the to do list, the dashboard application can apply a corresponding theme on to dos tile 330.

Figure 9A:
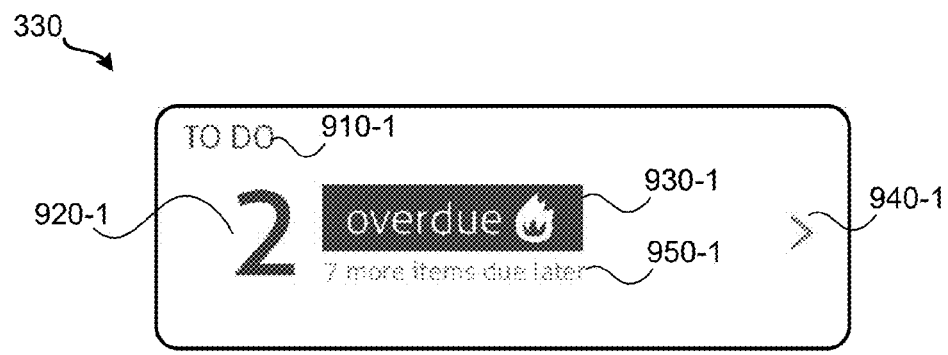
FIG. 9A illustrates an exemplary tile for presenting a list of to do items according to one embodiment.
Figure 10:
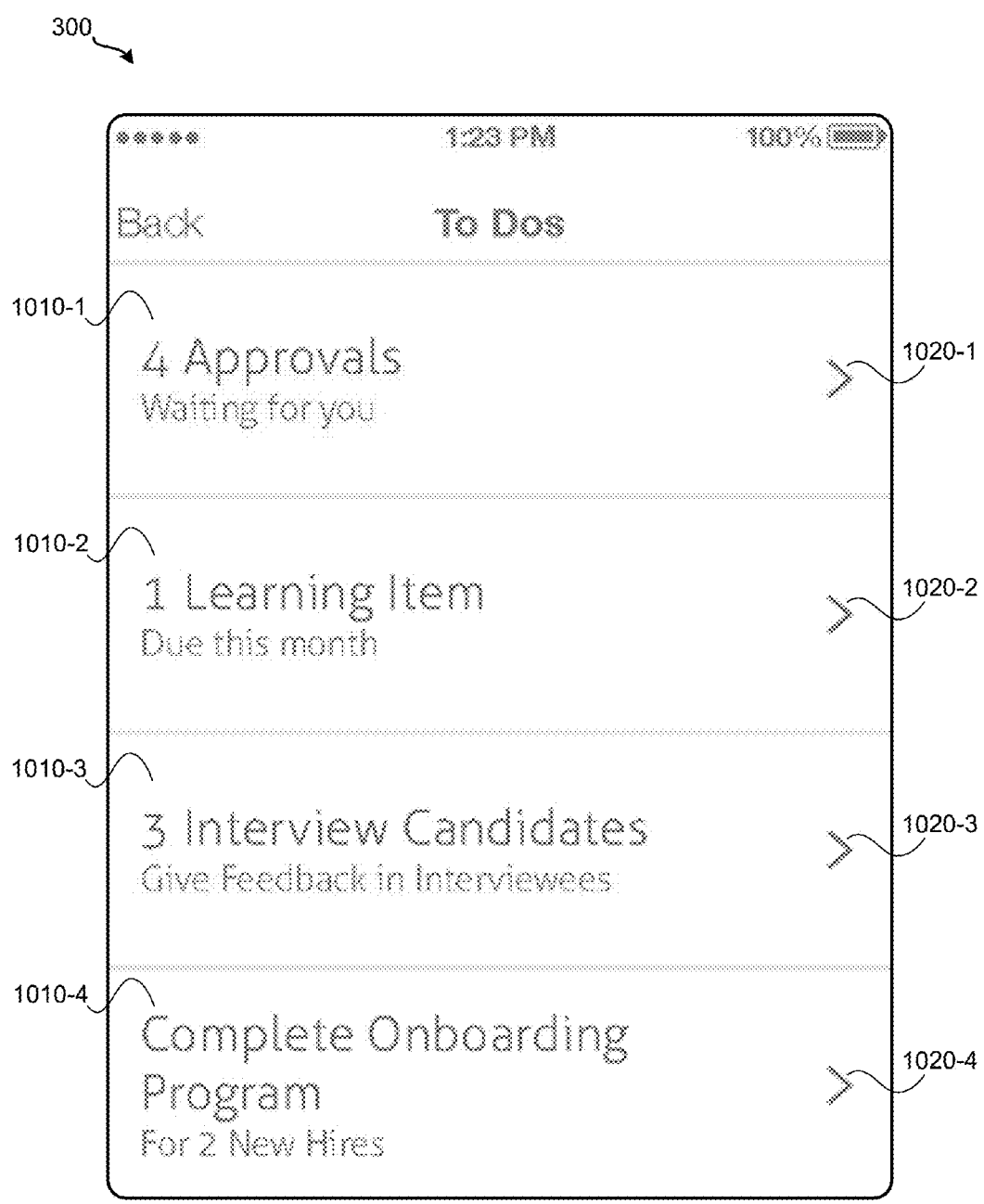
FIG. 10 illustrates an exemplary GUI for presenting a to do list according to one embodiment.

FIG. 9A illustrates an exemplary tile for presenting a list of to do items according to one embodiment. Here, the theme applied to dos tile 330 is a high-urgency theme. The high-urgency theme may be applied when the to do list has a high-urgency status (e.g., one or more to do items are overdue). To dos tile 330 includes headline 910, count 920, icon 930, action button 940, and details 950. The high-urgency theme can present headline 910-1 and count 920-1 (which indicates the number of to do items that are overdue) in red to indicate that to dos tile 330 should be examined by the user. The theme can also include icon 930-1 which serves to notify the user that there are to do items which are overdue. In some examples, an image such as a flame can also be included in icon 930-1 to grab the user's attention. Action button 940-1, when selected, can cause the dashboard application to transition to a to do GUI where the to do items can be examined or processed in detail. One example of a to do GUI is shown in FIG. 10. The theme can also include details 950-1 which indicates the total number of to do items that are in the list.

Figure 9B:
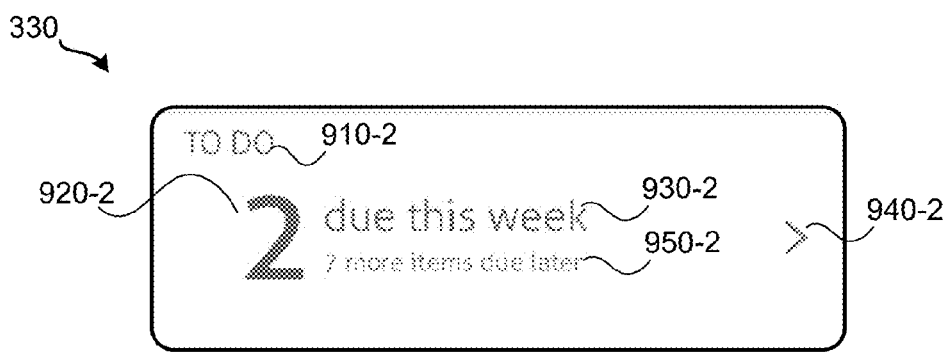
FIG. 9B illustrates another exemplary tile for presenting a list of to do items according to one embodiment.

FIG. 9B illustrates another exemplary tile for presenting a list of to do items according to one embodiment. Here, the theme applied to the to dos tile 330 is a mid-urgency theme. The mid-urgency theme can be applied when the to do list does not have overdue items but does have items which are due within the week. The mid-urgency theme can present headline 910-2, count 920-2, and icon 930-2 in blue to indicate that to dos tile should be examined if the user has time. In contrast to icon 930-1 which is in red and includes a flame image, icon 930-2 is blue and simply notifies the user that the number of items specified by count 920-2 are due this week. Details 950-2 can notify the user of the total number of to do items in the list. Similar to action button 940-1, action button 940-2 can cause the dashboard application to transition to a to do GUI for examining the to do items in detail.

Figure 9C:
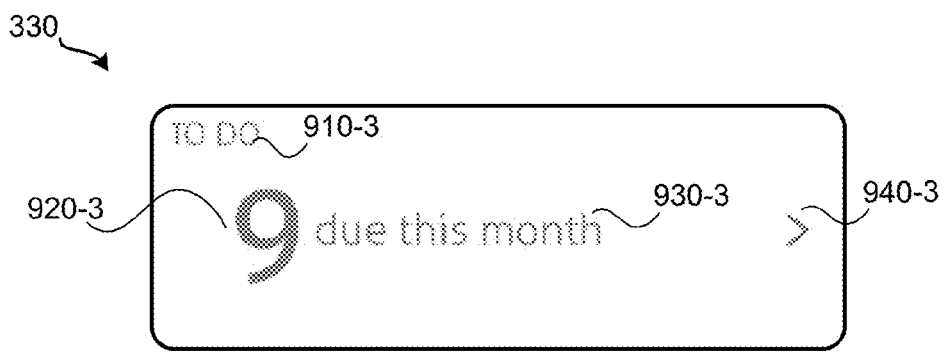
FIG. 9C illustrates another exemplary tile for presenting a list of to do items according to one embodiment.

FIG. 9C illustrates another exemplary tile for presenting a list of to do items according to one embodiment. Here, the theme applied to dos tile 330 is a low-urgency theme. The low-urgency theme can be applied when the to do list does not contain overdue items or items which are due within the week. Here, icon 930-3 can include text that notifies the user that the number of items specified by count 920-3 are due by this month. In other embodiments, the visual appearance of headline 910, count 920, icon 930, action button 940, and details 950 can vary between themes.

FIG. 10 illustrates an exemplary GUI for presenting a to do list according to one embodiment. GUI 1000 can be generated by the dashboard application to present details on a user's to do list. In some embodiments, the dashboard application can aggregate to do items from multiple features into the to do list. As a result, to do items that appear in one tile may also appear again in the to do list. As shown, the to do list can include items that belong to a different tile. For example, approvals which are monitored by approvals tile 395 can also be included in GUI 1000 since approvals are can be aggregated into the to do list. Similarly, learning items that appear in learning tile 340 can also appear in GUI 1000.

The dashboard application can categorize the to do items and present the to do items as categories in GUI 1000. Here, GUI 1000 includes four categories: approvals 1010-1, learning 1010-2, interview feedback 1010-3, and onboarding 1010-4. As the to do list dynamically changes as to do items are completed or to do items are added to the to do list, the dashboard application can update the categories being presented in GUI 1000. Each category can include a description which is configured to describe the category. The description can also specify the number of to do items that are within the category. Each category can also include action button 1020. Action button 1020, when selected, can cause the dashboard application to present a page on the dashboard for performing the to do items within the category. For example, selecting action button 1020-1 which is for approvals can cause the dashboard application to present approvals GUI 600 on the dashboard where the user can process the approvals. Once the approvals are processed, the user can return to GUI 1000. If all the approvals have been processed, the approvals category will no longer appear in GUI 1000.

In some embodiments, a theme can be applied to category 1010 to signify the urgency of the to do items within the category. For example, let's assume the user is looking at to dos tile 330 shown in FIG. 9B. To dos tile 330 notifies the user that there are two overdue to do items are 7 more to do items that are due later. If the user were to select on action button 940-1, GUI 1000 can be presented on the dashboard. Within GUI 1000, the category or categories that contain the two overdue items can be presented using a different theme. This can allow the user to prioritize his or her time to the high-urgency to do items in the to do list.

Figure 11:
FIG. 11 illustrates an exemplary interview feedback GUI according to one embodiment.

FIG. 11 illustrates an exemplary interview feedback GUI according to one embodiment. Interview feedback GUI can be presented by the dashboard application in response to detecting the selection of action button 1020-3 of FIG. 3 that is associated with interview feedback category 1010-3. As shown, interview feedback GUI 1100 is a simple user interface for providing a user's feedback on interviewees. The interview feedback tiles are sorted according to the open recs. For example, interview feedback tile 1112-1 and 1112-2 are grouped together as part of open rec 1110-1 (an open rec for a sales manager) while interview feedback tile 1112-3 is grouped as part of open rec 1110-2 (an open rec for a factory manager). Each interview feedback tile 1112 can include two action buttons, action button 1114 and action button 1116. If the user liked the interviewee, the user can select action button 1114. Alternatively if the user does not like the interviewee, then the user can select action button 1116. The dashboard application can transmit the user's feedback to an interview feedback feature which processes the user's feedback.

In some embodiments interview feedback tile 1112 can also be actionable where selecting the interview feedback tile can allow the user to provide additional interview feedback beyond a simple like/dislike. For example, the name of the interviewee as presented in interview feedback tile 1112 can be actionable where selecting on the interviewee's name can cause the dashboard application to present a detailed tile for entering interview feedback. The detailed tile can allow the user to add comments on the interviewee, view the interviewee's resume to refresh the user on who the interviewee is, and also provide a five star rating on the interviewee.

Learning Tile

Figure 12A:
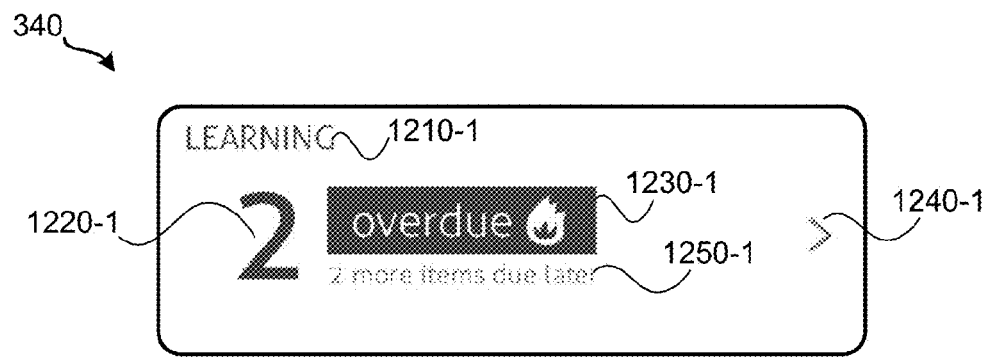
FIG. 12A illustrates an exemplary tile for presenting a learning feature according to one embodiment.

The learning tile can provide the status of an update feature that is available to the user. Similar to the to dos tile 330, the dashboard application can apply a theme to learning tile 340 based on the status of the learning feature. For example, the dashboard application may apply a high-urgency theme to learning tile 340 when it receives learning items which are overdue. FIG. 12A illustrates an exemplary tile for presenting a learning feature according to one embodiment. Here, learning tile 340 includes headline 1210-1, count 1220-1, icon 1230-1, action button 1240-1, and details 1250-1. The dashboard application has applied a high-urgency theme to learning tile 340 since there are two learning items which are currently overdue. The high-urgency theme can change the font color of headline 1210-1, count 1220-1, and icon 1230-1 to signify that the learning feature has overdue items. Selection of action button 1240-1 can cause the dashboard application to transition to a learning GUI where the learning items can be examined or processed in detail.

Figure 12B:
FIG. 12B illustrates another exemplary tile for presenting learning items according to one embodiment.

FIG. 12B illustrates another exemplary tile for presenting learning items according to one embodiment. Here, the theme applied to learning tile 330 is a mid-urgency theme. The mid-urgency theme can be applied when the learning feature does not have overdue items but does have items which are due within the week. The mid-urgency theme can present headline 1210-2, count 1220-2, and icon 1230-2 in blue to indicate that there are learning features due within a week. In contrast to icon 1230-1 which is in red and includes a flame image, icon 1230-2 is blue and simply notifies the user that the number of items specified by count 1220-2 are due this week. Details 1250-2 can notify the user the number of items that are due later. Similar to action button 940-1, action button 940-2 can cause the dashboard application to transition to a learning GUI for examining the learning items in detail.

Figure 12C:
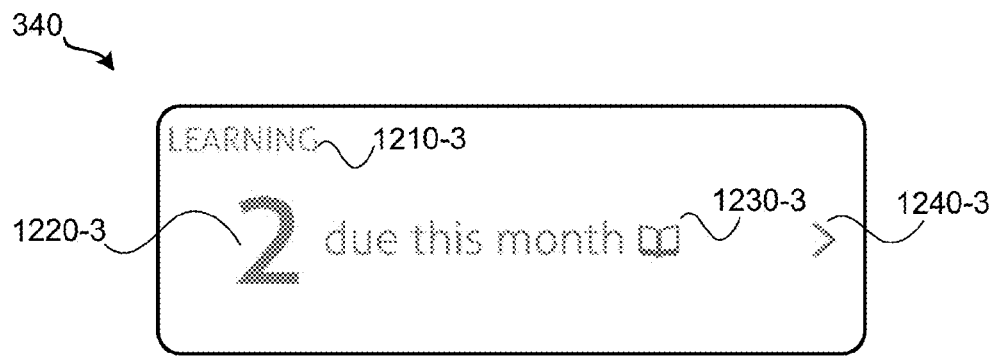
FIG. 12C illustrates another exemplary tile for presenting a list of learning items according to one embodiment.

FIG. 12C illustrates another exemplary tile for presenting a list of learning items according to one embodiment. Here, the theme applied to learning tile 340 is a low-urgency theme. The low-urgency theme can be applied when the list of learning items do not contain overdue items or items which are due within the week. Here, icon 1230-3 can include text that notifies the user that the number of items specified by count 1220-3 are due by this month. In other embodiments, the visual appearance of headline 1210, count 1220, icon 1230, action button 1240, and details 1250 can vary between themes.

Time Off Tile

The time off tile can be configured to provide the status of a time off feature which is used when employees take time off. Similar to the to dos tile 330, the dashboard application can apply a theme to time off tile 350 based on the status of the time off feature. For example, the dashboard application may apply a high-urgency theme when the user has not taken a vacation for over a predefined period of time, such as six months. The dashboard application can also apply a low-urgency theme when the user has taken a vacation within the predefined period of time. In some embodiments, different themes can present different information to the user. Here unlike the to dos tile, the high-urgency and low-urgency themes of the time off tile can present different information. While the high-urgency theme notifies the user when was the last time that the user took a vacation, the low-urgency theme can present a calendar of time that the user has taken off in the past year.

Figure 13A:
FIG. 13A illustrates an exemplary tile for presenting a time off feature according to one embodiment.

FIG. 13A illustrates an exemplary tile for presenting a time off feature according to one embodiment. Here, the user has not taken a vacation within the predefined period of time and as a result, time off tile 250 can have a high-urgency theme applied. As shown, a high-urgency theme applied on time off tile 350 can include headline 1310, message 1320, and action button 1330. Message 1320 can be predefined or personalized based on the user. Here, the period of time since the user's last vacation can be included in message 1320 to inform the user of the period of time in which the user has not taken a vacation. If action button 1330 is detected as being selected, the dash application can transition to a GUI where time-off analysis is presented to the user. In some examples, the color or font of headline 1310, message 1320, and action button 1330 can vary depending on the theme.

Figure 13B:
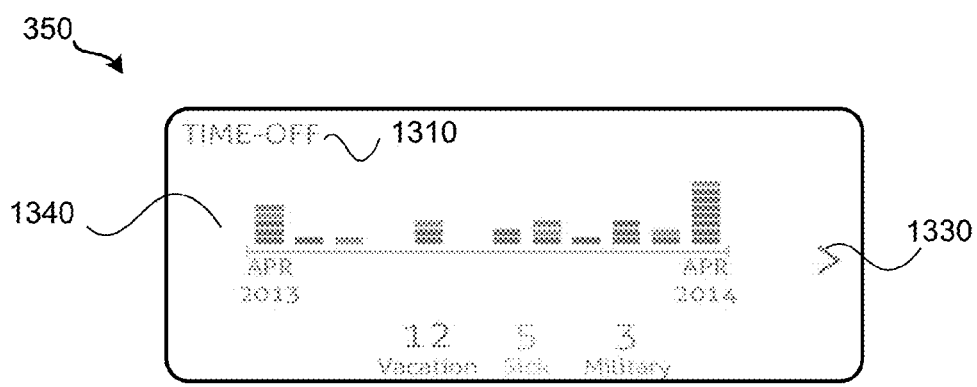
FIG. 13B illustrates another example for presenting a time off feature according to one embodiment.

FIG. 13B illustrates another example for presenting a time off feature according to one embodiment. Here, the dashboard application can generate time off tile 350 by using a low-urgency theme when the dashboard application detects that the period of time since the user's last vacation is below a certain threshold. The low-urgency theme can present different information than the high-urgency theme. As shown here, the low-urgency theme includes a chart that maps the user's vacation history for the past year. This allows the user to quickly view how many vacation/sick/military days that the user has saved up. This also allows the user to quickly review the time off that has been recorded by the business organization so that the user can confirm the accuracy of the business organization's bookkeeping.

Next Meeting Tile

The next meeting tile can be configured to display meeting info that is on the user's calendar. The dashboard application can communicate with a calendar (or meeting) feature and retrieve upcoming meetings that are on the user's calendar. Based on the upcoming meetings, the dashboard application can determine the status that should be applied to the next meeting tile and generate the next meeting tile using a theme that corresponds with the determined status.

Figure 14A:
FIG. 14A illustrates an exemplary tile for presenting a calendar feature according to one embodiment.

FIG. 14A illustrates an exemplary tile for presenting a calendar feature according to one embodiment. Here, the dashboard application has received information from a calendar feature about meetings that are on the user's calendar. Upon receiving the information, the dashboard application can determine that the next meeting for the user is in progress. Based on the GPS location of the user's device, the dashboard application can determine the approximate locate of the user and conclude that the user is not in the meeting. As a result, the dashboard application can generate next meeting tile 360 with a theme that correlates with high-urgency status. Here, the theme can include headline 1410-1, message 1420-1, avatars 1430-1, icon 1440-1, and action button 1450-1. Headline 1410-1 can include the title of next meeting tile 360 which allows the tile to be uniquely identified from other tiles. Message 1420-1 can include the topic of the meeting. Avatars 1430-1 can include avatars of the people who are attending the meeting. In one embodiment, the meeting organizer can be presented as the first avatar. Icon 1440-1 can include an image that notifies the user that the meeting is in progress. Here, icon 1440-1 is an alarm clock to notify the user that the meeting is in progress.

Action button 1450-1 is an actionable button. When action button 1450-1 is selected, the dashboard application can transition and present a GUI on the dashboard that presents details on the meeting. These details can include the location of the meeting, the full list of attendees (or invitees), a short description of the purpose of the meeting, attached documents to discuss during the meeting, or other meeting information.

Figure 14B:
FIG. 14B illustrates another exemplary tile for presenting a calendar feature according to one embodiment.

FIG. 14B illustrates another exemplary tile for presenting a calendar feature according to one embodiment. Here, the dashboard application can generate time off tile 350 by using a medium-urgency theme when the dashboard application detects that the next meeting is within a predefined threshold of time (e.g., 10 minutes). Similar to the high-urgency theme in FIG. 14A, the middle-urgency theme of FIG. 14B presents the same headline, message, and avatars as the high urgency theme in FIG. 14A. However, the color of the headline, message, or avatars can be different to distinguish high-urgency status from medium-urgency status. Here, the medium-urgency theme can be configured to present icon 1440-2 as an image that describes the amount of time that remains before the beginning of the next meeting. Here, the image is a value that corresponds with the time remaining in other embodiments, the image can be a clock, stopwatch, or other time-related image that describes the amount of time remaining before the next meeting.

Figure 14C:
FIG. 14C illustrates another exemplary tile for presenting a calendar feature according to one embodiment.

FIG. 14C illustrates another exemplary tile for presenting a calendar feature according to one embodiment. FIG. 14C is like FIGS. 14A and 14B in that the headline, message, and avatars remain the same. However, the low-urgency theme of FIG. 4C displays the time of the next meeting in icon 1440-3 rather than the time remaining before the next meeting (as in the middle-urgency theme) or an alarm clock (as in the high-urgency theme).

Fuel Tile

Figure 15:
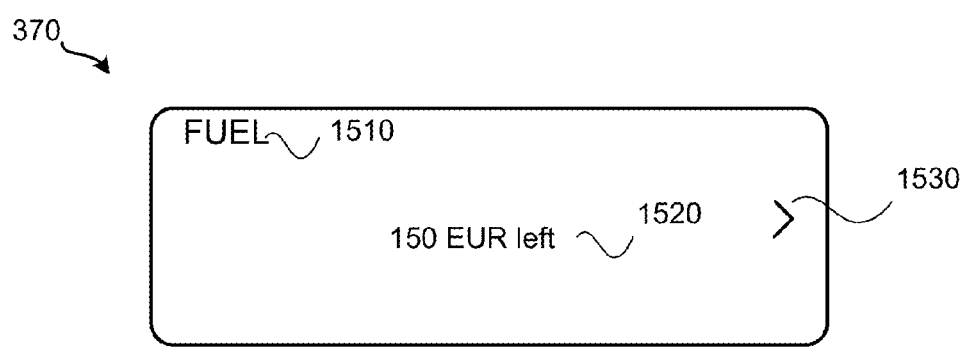
FIG. 15 illustrates an exemplary tile for presenting a fuel feature according to one embodiment.

As described in FIGS. 3A and 3B, the collection of tiles can also include a fuel tile. The fuel tile can be configured to present information related to fuel reimbursement for the user. FIG. 15 illustrates an exemplary tile for presenting a fuel feature according to one embodiment. As shown, the dashboard application can generate fuel tile 370 with headline 1510, message 1520, and action button 1530. Message 1520 can present various information related to fuel consumption or reimbursement, such as the amount of money spent over a duration of time, the amount of money remaining in the fuel budget, the amount of miles driver, the amount of miles remaining, or other fuel or travel related information. Fuel tile 370 further includes action button 1530 which when selected, causes dashboard application to present a more detailed view of the fuel feature.

Figure 16:
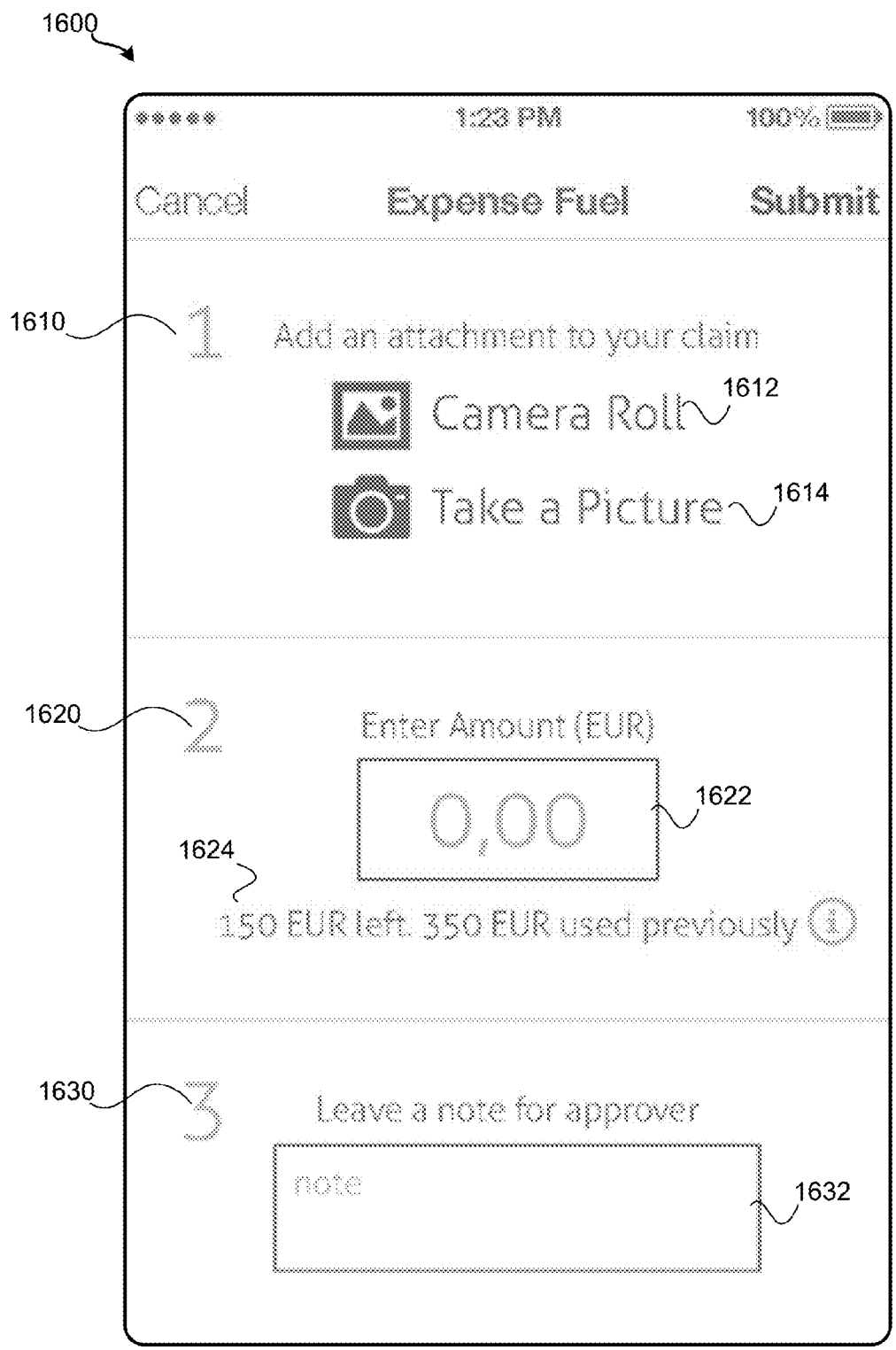
FIG. 16 illustrates a detailed graphical user interface for a fuel feature according to one embodiment.

FIG. 16 illustrates a detailed graphical user interface for a fuel feature according to one embodiment. As shown, GUI 1600 includes three steps for submitting a fuel expense. The first step (section 1610) is to add an attachment to the fuel claim. As shown, section 1610 includes two options: option 1612 which selects an image from the camera roll of the client device and option 1614 which takes a picture with the client device. The second step (section 1620) is to include the amount spent on fuel. The amount spent can be entered into field 1622 while details 1624 can present the remaining balance which the user can expense. The third step (section 1630) includes field 1632. Field 1632 is a field in which the user can leave comments for the approver.

Methods

Figure 17:
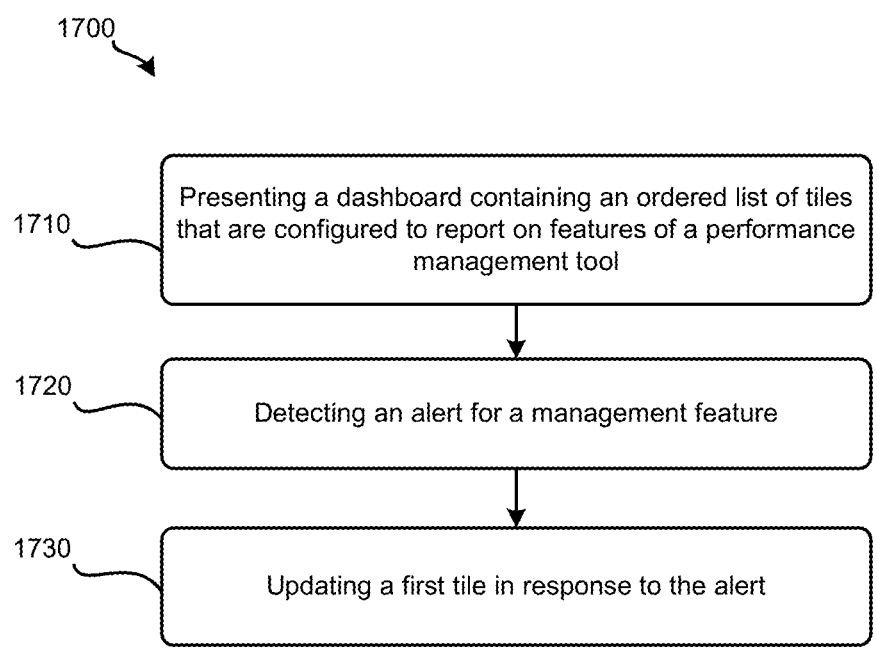
FIG. 17 illustrates a process for presenting a dashboard according to one embodiment.

FIG. 17 illustrates a process for presenting a dashboard according to one embodiment. Process 1700 can be stored in computer readable code and executed by a processor. For example, process 1700 can be a part of the computer readable code stored in storage device 124 in client device 120 of FIG. 1. Process 1700 begins by presenting a dashboard containing an ordered list of tiles that are configured to report on features of a performance management tool at 1710. The performance management tool can be remote to the portable electronic device that is executing process 1700. The ordered list of tiles can include a first tile configured to report on a management feature provided by the performance management tool. In one example, the ordered list of tiles can be presented as one stacked on top of the other.

Process 1700 continues by detecting an alert for the management feature at 1720. In one embodiment, the alert can be received from the performance management tool. In another embodiment, the alert can be derived from updates received from the performance management tool. Once the alert has been detected, process 1700 can continue by updating the first tile in response to the alert at 1730. In one example, updating the first tile can include applying a theme to the first tile. In another example, updating the first tile can include determining that the alert contains an action item having an urgent state, identifying a visual theme that corresponds with the urgent state, and changing a visual attribute of the first tile according to the visual theme. In yet another example, updating the first tile can include changing where the first tile is positioned in the ordered list of tiles. In yet another example, updating the first tile can include making the first tile visible in the dashboard rather than hidden.

In one example where the management feature is a calendar feature, detecting the alert can include determining that a meeting is currently in progress (or soon to be in progress) and determining that the user is not at the meeting location corresponding to the meeting. In another example where the management feature is a goals management feature, detecting the alert can include determining that a goal is past due.

Computer System

Figure 18:
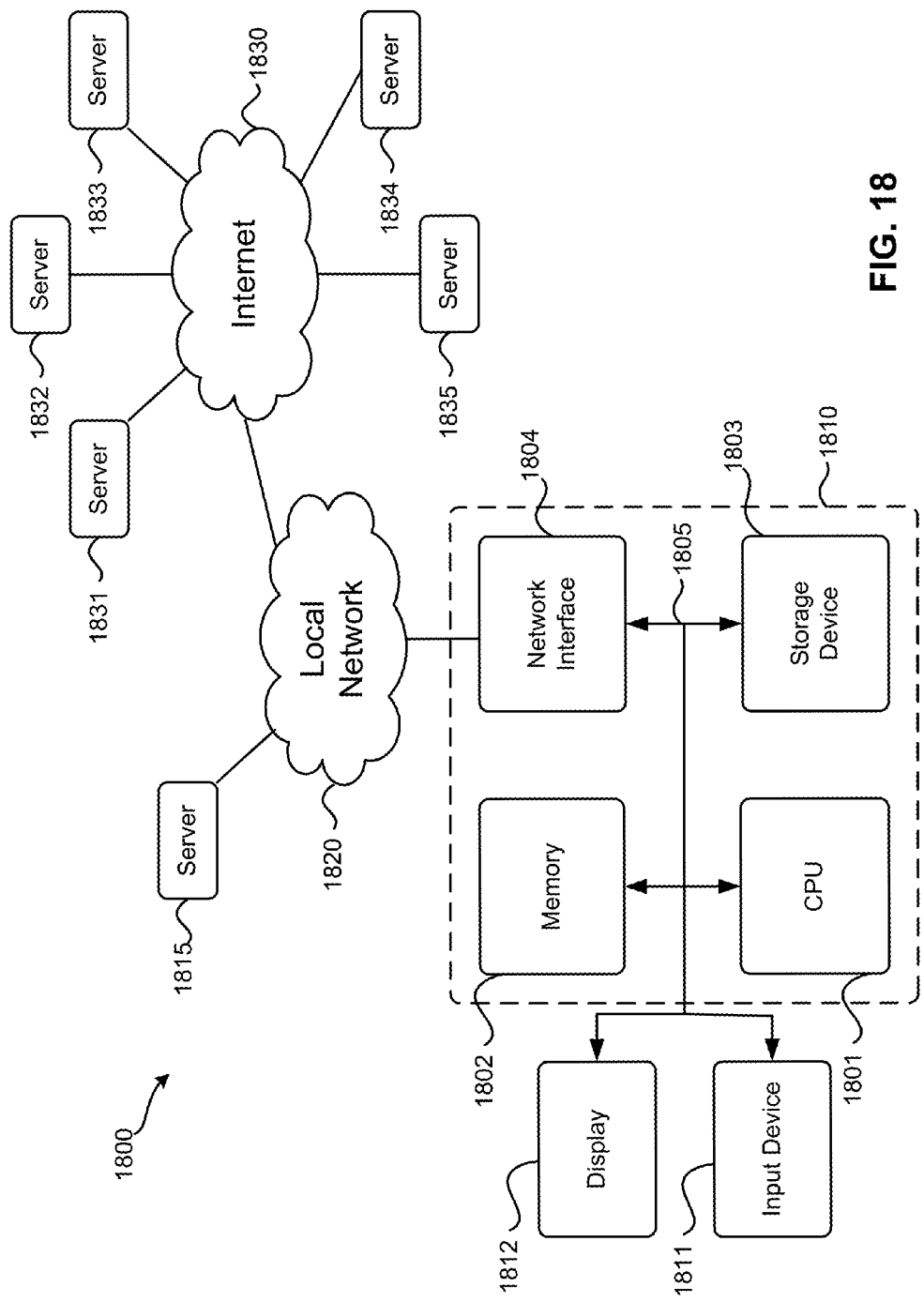
FIG. 18 illustrates an exemplary computer system according to one embodiment.

An exemplary computer system 1800 is illustrated in FIG. 18. Computer system 1810 includes a bus 1805 or other communication mechanism for communicating information, and a processor 1801 coupled with bus 1805 for processing information. Computer system 1810 also includes memory 1802 coupled to bus 1805 for storing information and instructions to be executed by processor 1801, including information and instructions for performing the techniques described above, for example. This memory may also be used for storing variables or other intermediate information during execution of instructions to be executed by processor 1801. Possible implementations of this memory may be, but are not limited to, random access memory (RAM), read only memory (ROM), or both. A storage device 1803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1803 may include source code, binary code, or software files for performing the techniques above, for example. Storage device and memory are both examples of computer readable mediums.

Computer system 1810 may be coupled via bus 1805 to a display 1812, such as a cathode ray tube (CRT) or liquid crystal display (LCD), for displaying information to a computer user. An input device 1811 such as a keyboard and/or mouse is coupled to bus 1805 for communicating information and command selections from the user to processor 1801. The combination of these components allows the user to communicate with the system. In some systems, bus 1805 may be divided into multiple specialized buses.

Computer system 1810 also includes a network interface 1804 coupled with bus 1805. Network interface 1804 may provide two-way data communication between computer system 1810 and the local network 1820. The network interface 1804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 1810 can send and receive information, including messages or other interface actions, through the network interface 1804 across a local network 1820, an Intranet, or the Internet 1830. For a local network, computer system 1810 may communicate with a plurality of other computer machines, such as server 1815. Accordingly, computer system 1810 and server computer systems represented by server 1815 may form a cloud computing network, which may be programmed with processes described herein. In the Internet example, software components or services may reside on multiple different computer systems 1810 or servers 1831-1835 across the network. The processes described above may be implemented on one or more servers, for example. A server 1831 may transmit actions or messages from one component, through Internet 1830, local network 1820, and network interface 1804 to a component on computer system 1810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:

presenting, by a portable electronic device of limited screen size, a dashboard comprising a first region and a second region, the first region containing an ordered vertical list of tiles in a single column with abutting horizontal line borders, that are configured to report on features of a performance management tool remote to the portable electronic device, wherein a first tile is configured to report on a first management feature displaying a number of pending approvals provided by the performance management tool, the second region being a footer to which dashboard elements other than the ordered vertical list of tiles are confined;

in response to user selection of a first interactive element on the first tile, the portable electronic device transitioning to a single tile displaying an approval detail;

in response to user selection of a second interactive element on the single tile, modifying the first tile with a changed number of pending approvals;

detecting, by the portable electronic device, an alert for a second tile configured to report on a second management feature; and updating, by the portable electronic device, the second tile in response to the alert by,
determining, by the portable electronic device, that the alert contains an action item having an urgent state,
identifying, by the portable electronic device, a visual theme that corresponds with the urgent state, and
changing, by the portable electronic device, a visual attribute of the second tile according to the visual theme.

2. The computer-implemented method of claim 1, wherein the second tile includes a chart and changing the visual attribute of the second tile comprises changing a color for an element in the chart, wherein the element is associated with the action having an urgent state.

3. The computer-implemented method of claim 1, wherein updating the second tile comprises moving, by the portable computing device, the second tile to a different position in the ordered vertical list of tiles.

4. The computer-implemented method of claim 1, further comprising presenting, by the portable computing device, the first tile on the dashboard before other tiles in the ordered vertical list of tiles.

5. The computer-implemented method of claim 1, wherein the second management feature is a calendar feature and detecting the alert comprises:
first determining, by the portable electronic device, that a meeting is currently in progress, the meeting having a meeting location; and
second determining, by the portable electronic device, that the portable electronic device is outside a proximity of the meeting location.

6. The computer-implemented method of claim 1, wherein the second management feature is a goals management feature and detecting the alert comprises:
determining, by the portable electronic device, that a goal of the goals management feature is past due.

7. A non-transitory computer readable storage medium storing one or more programs, the one or more programs comprising instructions for:
presenting by a portable electronic device of limited screen size, a dashboard comprising a first region and a second region, the first region containing an ordered vertical list of tiles in a single column with abutting horizontal line borders, that are configured to report on features of a performance management tool remote to the portable electronic device, wherein a first tile is configured to report on a first management feature displaying a number of pending approvals provided by the performance management tool, the second region being a footer to which dashboard screen elements other than the ordered vertical list of tiles are confined;
in response to user selection of a first interactive element on the first tile, the portable electronic device transitioning to a single tile displaying an approval detail;
in response to user selection of a second interactive element on the single tile, modifying the first tile with a changed number of pending approvals;
detecting an alert for a second tile configured to report on a second management feature; and
updating the second tile in response to the alert by,
determining that the alert contains an action item having an urgent state,
identifying a visual theme that corresponds with the urgent state, and
changing a visual attribute of the second tile according to the visual theme.

8. The non-transitory computer readable storage medium of claim 7, wherein the second tile includes a chart and changing the visual attribute of the second tile comprises changing a color for an element in the chart, wherein the element is associated with the action having an urgent state.

9. The non-transitory computer readable storage medium of claim 7, wherein updating the second tile comprises moving, by the portable computing device, the second tile to a different position in the ordered vertical list of tiles.

10. The non-transitory computer readable storage medium of claim 7, further comprising presenting, by the portable computing device, the first tile on the dashboard before other tiles in the ordered vertical list of tiles.

11. The non-transitory computer readable storage medium of claim 7, wherein the second management feature is a calendar feature and detecting the alert comprises:
first determining that a meeting is currently in progress, the meeting having a meeting location; and
second determining that the portable electronic device is outside a proximity of the meeting location.

12. The non-transitory computer readable storage medium of claim 7, wherein the second management feature is a goals management feature and detecting the alert comprises:
determining that a goal of the goals management feature is past due.

13. A computer implemented system, comprising:
one or more computer processors; and
a non-transitory computer-readable storage medium comprising instructions, that when executed, control the one or more computer processors to be configured for:
presenting by a portable electronic device of limited screen size, a dashboard comprising a first region and a second region, the first region containing an ordered vertical list of tiles in a single column with abutting horizontal line borders, that are configured to report on features of a performance management tool remote to the portable electronic device, wherein a first tile is configured to report on a first management feature displaying a number of pending approvals provided by the performance management tool, the second region being a footer to which dashboard screen elements other than the ordered vertical list of tiles are confined;
in response to user selection of a first interactive element on the first tile, the portable electronic device transitioning to a single tile displaying an approval detail;
in response to user selection of a second interactive element on the single tile, modifying the first tile with a changed number of pending approvals;
detecting an alert for a second tile configured to report on a second management feature; and
updating the second tile in response to the alert by,
determining that the alert contains an action item having an urgent state,
identifying a visual theme that corresponds with the urgent state, and
changing a visual attribute of the first tile according to the visual theme.

14. The computer implemented system of claim 13, wherein the second tile includes a chart and changing the visual attribute of the second tile comprises changing a color for an element in the chart, wherein the element is associated with the action having an urgent state.

15. The computer implemented system of claim 13, wherein updating the first tile comprises moving, by the portable computing device, the first tile to a different position in the ordered vertical list of tiles.

16. The computer implemented system of claim 13, wherein the second management feature is a calendar feature and detecting the alert comprises:
   first determining that a meeting is currently in progress, the meeting having a meeting location; and
   second determining that the portable electronic device is outside a proximity of the meeting location.

17. The computer implemented system of claim 13, wherein the second management feature is a goals management feature and detecting the alert comprises:
   determining that a goal of the goals management feature is past due.

* * * * *